(12) United States Patent
Cherkasova et al.

(10) Patent No.: US 6,823,392 B2
(45) Date of Patent: Nov. 23, 2004

(54) HYBRID AND PREDICTIVE ADMISSION CONTROL STRATEGIES FOR A SERVER

(75) Inventors: Ludmila Cherkasova, Sunnyvale, CA (US); Peter Phaal, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 23 days.

(21) Appl. No.: 09/995,760

(22) Filed: Nov. 29, 2001

(65) Prior Publication Data

US 2002/0052962 A1 May 2, 2002

Related U.S. Application Data

(63) Continuation of application No. 09/192,723, filed on Nov. 16, 1998.

(51) Int. Cl.[7] ............................................. G06F 15/16
(52) U.S. Cl. ...................... 709/229; 709/227; 709/226; 709/219; 370/230; 370/235; 370/237
(58) Field of Search ................................ 709/226, 225, 709/229; 370/230

(56) References Cited

U.S. PATENT DOCUMENTS

| | | | | |
|---|---|---|---|---|
| 5,408,465 A | * | 4/1995 | Gusella et al. | 370/231 |
| 5,793,976 A | * | 8/1998 | Chen et al. | 709/224 |
| 5,974,237 A | * | 10/1999 | Shurmer et al. | 709/224 |

(List continued on next page.)

OTHER PUBLICATIONS

Jamin et al., "Comparison of measurement–based admission control algorithms for controlled–load service," Apr. 1997, Infocom '97. Sixteenth Joint Conference on the IEEE Computer and Communications Societies, vol. 3, pp. 973–980.*

Vin et al., "An Observation–Based Admission Control Algorithm for Multimedia Servers," May 1994, IEEE Proceedings of the International Conference on Multimedia Computing and Systems, p. 234–243.*

Jamin et al., "A Measurement–Based Admission Control Algorithm for Integrated Service Packet Networks," Feb. 1997, IEEE/ACM Transactions on Networking, vol. 5, No. 1, pp. 56–70.*

Saito, "Hybrid connection admission control in ATM networks," Jun. 1992, IEEE International Conference on Communications 1992, SUPERCOMM/ICC '92, Discovering a New World of Communications, vol. 2, pp. 699–703.*

Alqaed et al., "A hybrid equivalent capacity admission control algorithm for ATM congestion control," Dec. 1993, Proceedings, Global Data Networking, 1993, pp. 54–59.*

Siwko et al., "Call Admission Control Policy for Capacity–Varying Networks with Increasing Failure Rate Holding Time Distributions," Jun. 1998, 1998 IEEE Conference on Communications, vol. 2, pp. 832–836.*

(List continued on next page.)

Primary Examiner—Dung C. Dinh
Assistant Examiner—Bradley Edelman

(57) ABSTRACT

An admission control system for a server including an admission controller that receives a stream of messages from one or more clients targeted for the server. The admission controller relays to the server the messages in the stream that correspond to a number of sessions already underway between the clients and the server. The admission controller also relays to the server the messages in the stream that do not correspond to sessions already underway if a hybrid and predictive admission control strategy using information provided by a resource monitor indicates that additional sessions can be handled by the server. The admission controller defers the messages otherwise.

20 Claims, 4 Drawing Sheets

U.S. PATENT DOCUMENTS

| | | | | |
|---|---|---|---|---|
| 6,016,311 | A | * | 1/2000 | Gilbert et al. ............... 370/280 |
| 6,041,354 | A | * | 3/2000 | Biliris et al. ................ 709/226 |
| 6,055,564 | A | * | 4/2000 | Phaal ......................... 709/207 |
| 6,137,777 | A | * | 10/2000 | Vaid et al. .................. 370/230 |
| 6,154,849 | A | * | 11/2000 | Xia ............................... 714/4 |
| 6,216,006 | B1 | * | 4/2001 | Scholefield et al. ........ 455/450 |
| 6,223,205 | B1 | * | 4/2001 | Harchol-Balter et al. ... 709/105 |
| 6,266,323 | B1 | * | 7/2001 | Valko et al. ................ 370/230 |
| 6,279,039 | B1 | * | 8/2001 | Bhat et al. .................. 709/226 |
| 6,292,465 | B1 | * | 9/2001 | Vaid et al. .................. 370/230 |
| 6,330,226 | B1 | * | 12/2001 | Chapman et al. ........... 370/232 |
| 6,377,548 | B1 | * | 4/2002 | Chuah ........................ 370/233 |
| 6,567,416 | B1 | * | 5/2003 | Chuah ........................ 370/418 |
| 6,636,503 | B1 | * | 10/2003 | Shiran et al. ............... 370/352 |
| 6,697,378 | B1 | * | 2/2004 | Patel ........................... 370/468 |

OTHER PUBLICATIONS

Chen et al., "Resource Management for Third Generation Cellular Communication Systems," May 1997, 1997 IEEE $47^{th}$ Vehicular Technology Conference, vol. 3, pp. 1832–1836.*

Khan et al., "Distributed–Queuing Call Administration Control in Wireless Packet Communications," Oct. 1997, 1997 IEEE $6^{th}$ International Conference on Universal Personal Communications Record, vol. 1, pp. 134–140.*

* cited by examiner

HYBRID AND PREDICTIVE ADMISSION CONTROL STRATEGIES FOR A SERVER

CROSS REFERENCE TO RELATED APPLICATION(S)

This is a (X) continuation of copending application Ser. No. 09/192,723 filed on Nov. 16, 1998, which is hereby incorporated by reference herein.

BACKGROUND OF THE INVENTION

1. Field of Invention

The present invention relates generally to the field of servers and pertains more particularly to a system for providing reliable client/server sessions by controlling the admission of arriving messages to a server.

2. Discussion of the Prior Art

Servers are commonly employed for sharing of information among large numbers of computer systems or similar devices. A computer system or similar device that communicates with a server is usually referred to as a client of the server and the server is often part of a host system. A client and a host typically exchange messages via a communication network using a predetermined protocol. Such protocols are usually arranged in a client/host model in which a requesting client transfers a request message to a host and the host in turn takes an appropriate action depending on the content of the request message. Typically, the appropriate action for the request message includes the transfer of a response message to the requesting client.

Prior protocols typically do not allow for the establishment of a persistent session between the client and the host in the traditional sense in which a local terminal establishes a session on the computer system. Instead, any session-like information is usually implied in the content of the messages exchanged between the client and the host. Such a communication protocol may be referred to as a "stateless" protocol. Such stateless protocols include protocols associated with Internet communication including the Internet Protocol.

A client that accesses a host commonly engages in an extended transaction with the host. Such an extended transaction typically involves the exchange of multiple messages between the client and the host. For example, an NFS client typically issues multiple request messages to an NFS server while retrieving a file from the NFS server. Similarly, an HTTP client typically issues multiple request messages to an HTTP server while browsing through web pages contained on the HTTP server. Such transactions that involve the exchange of multiple messages between a client and a server are hereinafter referred to as sessions.

Servers commonly have a large pool of potential clients which may issue request messages. For example, an HTTP server connected to the world-wide-web has potentially millions of clients from which it may receive request messages. Prior servers that are adapted for stateless protocols typically respond to each request message in the order in which it is received, that is, on a first-come-first-served basis regardless of the source of the request message.

In the present context, the term "quality of service" refers both a host's ability to provide quick response to a message and to complete an entire session. As a particular host becomes more popular, and due to that popularity receives more messages, the host's processing resources can become stretched. For example, due to heavy traffic, a host may not be able to respond to a message at all, or the host may not provide a timely response which can cause a client to "time-out" and generate an error. Poor quality of service can have significant results, as users may become frustrated and simply give up trying to reach a particular host, or the sponsor of the host may lose sales or fail to communicate needed information to any or all clients.

Two techniques are generally used to alleviate quality of service problems. First, more processing capacity can be added to the host, typically by either replacing the host with another, more powerful computer, or by providing multiple computers in parallel and delegating new messages to different ones of the multiple computers. While this first technique presents an effective way of reducing some quality of service problems, it is not always practical. For example, sometimes, due to inadequate planning, budgetary constraints or space constraints, additional processing capacity simply cannot be added. Other times, if demand for a host is not properly forecast, there may be a long lead time before additional processing capacity can be purchased and implemented.

A second technique calls for applying "admission control," where only a certain set number of client messages are processed ("admitted") and the remainder are refused. Of the messages which are in fact admitted, all are ideally handled in an expedient manner without degradation of quality of service as to those admitted messages. An advantage of this technique is that admission control can be implemented in software, thus facilitating quick, inexpensive use with little advance notice. Unfortunately, typical admission control mechanisms operate by admitting messages on a message-by-message basis, and so, these typical admission control techniques do not provide an adequate solution for multiple-message sessions. Also, the messages which are not admitted to the host are generally not handled at all, such that a client is not informed that the request has been refused or the client, if informed, is simply asked to "try again later." Typically, a refused client must try repeatedly to obtain service with no guarantee that future requests will be processed. For these reasons and others, techniques generally used to alleviate quality of service problems are not always successful.

A definite need exists for an admission control system having an improved ability to alleviate quality of service problems. In particular, a need exists for an admission control system which responds to all messages, whether or not those messages are actually admitted. Ideally, such system would operate by admitting entire sessions, not just individual messages, such that messages relating to a session in-progress are generally admitted. With a system of this type, admission control would at least provide a reliable means of finishing each session with high quality of service. Finally, a need exists for a system that provides some level of service to all clients, including those which have been refused admission. The present invention solves these needs and provides further, related advantages.

SUMMARY OF THE INVENTION

An admission control system for a server is disclosed including an admission controller that receives a stream of messages from one or more clients targeted for the server. The admission controller relays to the server the messages in the stream that correspond to a number of sessions already underway between the clients and the server. The admission controller also relays to the server the messages in the stream that do not correspond to sessions already underway if a hybrid and predictive admission control strategy using information provided by a resource monitor indicates that additional sessions can be handled by the server. The admission controller defers the messages otherwise.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

Figure 1:
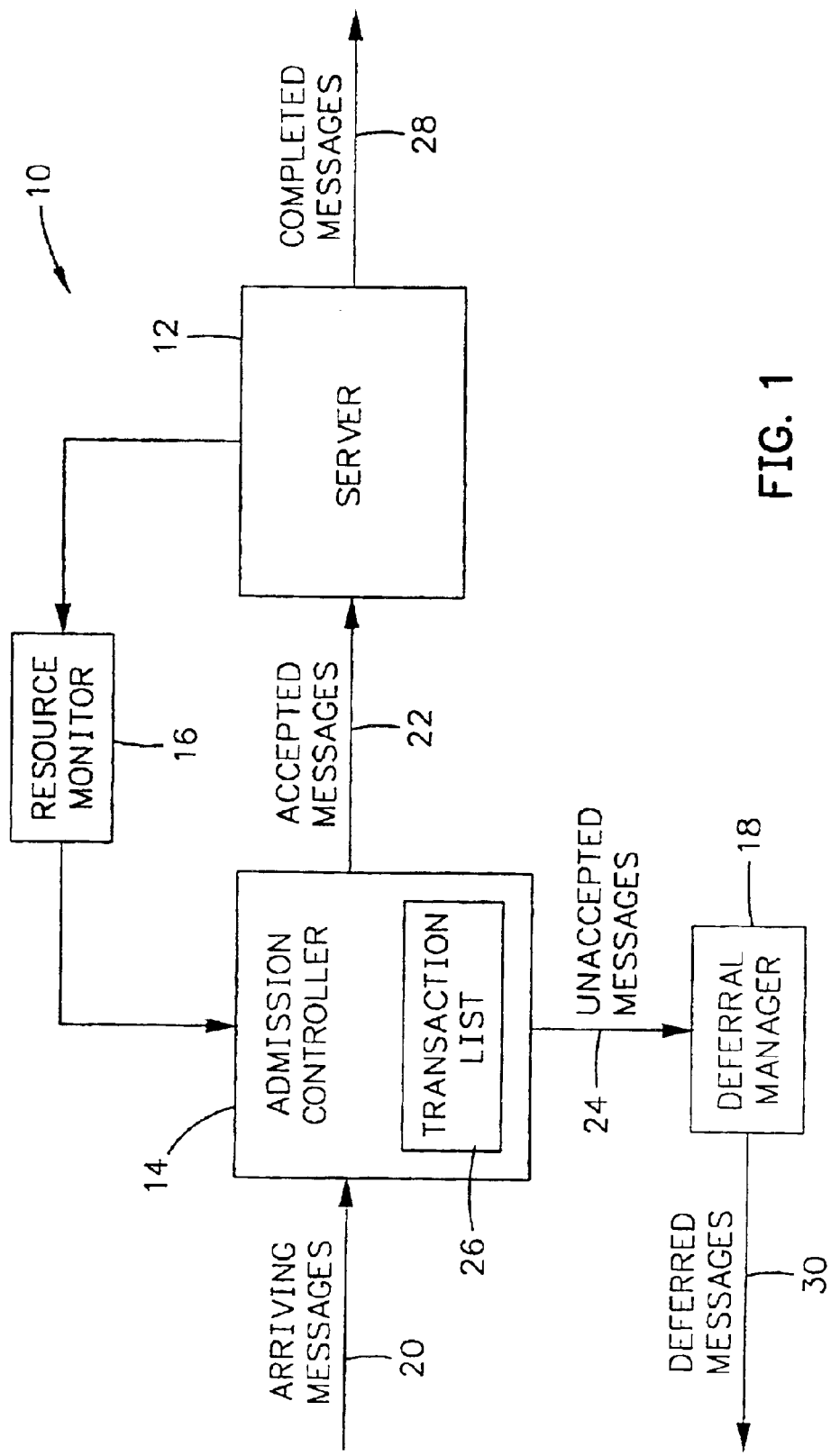
FIG. 1 is a block diagram of an admission control system that provides reliable sessions between clients and a server.

A purpose of the present invention is to provide improved quality of service of a server through hybrid and predictive admission control strategies. Turning first to FIG. 1, a block diagram of an admission control system 10 that provides reliable sessions between clients (not shown) and a server 12 is shown. The admission control system 10 includes the server 12, an admission controller 14, a resource monitor 16, and a deferral manager 18. The admission controller 14 processes a stream of arriving messages 20 from clients into a stream of accepted messages 22 and a stream of unaccepted messages 24. The accepted messages 22 are passed on to the server 12 and the unaccepted messages 24 are passed on to the deferral manager 18. It is important to note that there is a practical limit to the number of messages in the stream of arriving messages 20 for a given time interval. That is, only a finite number of messages can be captured for processing by the admission control system 10. Any messages that are sent by clients but do not become part of the stream of arriving messages 20 are referred to as refused connections. Refused connections often result in aborted sessions. Refused connections are handled according to the applicable protocol.

The server 12 represents any server that processes request messages using a stateless protocol in which clients do not establish persistent sessions with the server. In one embodiment, the server 12 is a web server that processes request messages from web clients using the HTTP. In another embodiment, the server 12 is a NFS server that processes request messages from NFS clients using the NFS protocol. In other embodiments, the server 12 may be adapted to the IP, the UDP, or the SMTP, to name a few examples.

The server 12 includes resources (not shown) that are involved in the servicing of the arriving messages 20. These resources include, for example, one or more processors or central processing units (CPUs), various types of memory and storage subsystems, and network communication subsystems.

The resource monitor 16 monitors the utilization of the resources in the server 12 that are involved in the servicing of the accepted messages 22 and provides the admission controller 14 with indications of the utilization of the resources. These indications or metrics inform the admission controller of whether sufficient resources are available in the server to provide an adequate level of service to new sessions.

In one embodiment, the resource monitor 16 measures the CPU utilization in the server 12. In another embodiment, the resource monitor measures the utilization of the network pathway for the accepted messages 22 to the server. In a further embodiment, the resource monitor measures the utilization of a storage subsystem, such as a disk drive, of the server. In still another embodiment, the resource monitor 16 measures the percentage of aborted client requests as an indication that the level of service is unsatisfactory. In an additional embodiment, the resource monitor measures the percentage of new sessions refused as an indication that the server 12 is overloaded. In yet another embodiment, the resource monitor generates a combined metric for use by the admission controller 14 that takes into account a number of the above metrics.

The admission controller 14 receives the stream of arriving messages 20 which are targeted for the server 12. Each of the arriving messages specifies a client request for the server. Each client request implies an action to be taken by the server in accordance with the predetermined communication protocol which the server processes.

The admission controller 14 processes individual ones of the arriving messages 20 based upon the indications provided by the resource monitor 16 and a determination of whether the arriving messages correspond to sessions already underway with the server 12. In one embodiment, a transaction list 26 identifies any session underway between the server and a requesting client. The admission controller compares client source indications contained in the arriving messages to entries in the transaction list to determine whether the arriving messages correspond to sessions underway. In another embodiment, the admission controller determines whether the arriving messages correspond to sessions underway by determining whether valid transaction identifiers are contained in the arriving messages.

The admission controller 14 accepts the ones of the arriving messages 20 that correspond to sessions underway. In addition, the admission controller accepts the ones of the arriving messages that do not correspond to existing sessions if the resource monitor 16 indicates that there are sufficient resources in the server 12 to adequately process a new session.

The server 12 receives and processes each of the accepted messages 22 in the order received at the server. A stream of completed messages 28 represents the actions taken by the server in response to the accepted messages. For example, the completed messages may contain response information to be transported to the requesting clients that originated the corresponding accepted messages.

The deferral manager 18 handles the unaccepted messages 24 which were blocked by the admission controller 14. In one embodiment, the deferral manager transfers the unaccepted messages as a stream of deferred messages 30 to another server (not shown) that replicates the functionality of the server 12. For example, if the server is a web server then the deferral manager redirects the deferred messages to another web server, often called a mirror site, that performs the same function as the web server 12.

In another embodiment wherein the server 12 is a web server, the deferral manager 18 transfers response messages back to the requesting web clients which indicate that a bonus or incentive is available if the deferred request is retried at a later time. For example, if the web server provides a sales transaction to requesting web clients, then the deferred messages 30 are targeted for the deferred requesting clients and may contain encoded information that provides the client with a discount on a later purchase.

In another embodiment, the deferral manager 18 directs the deferred messages 30 to another server that enables the deferred web client to reserve a future time interval for access to the server 12. Alternatively, the server may provide a function that enables the deferred web client to reserve a future time. In addition, the deferral manager may transfer a response message to the deferred client that indicates that the request is being deferred.

Figure 2:
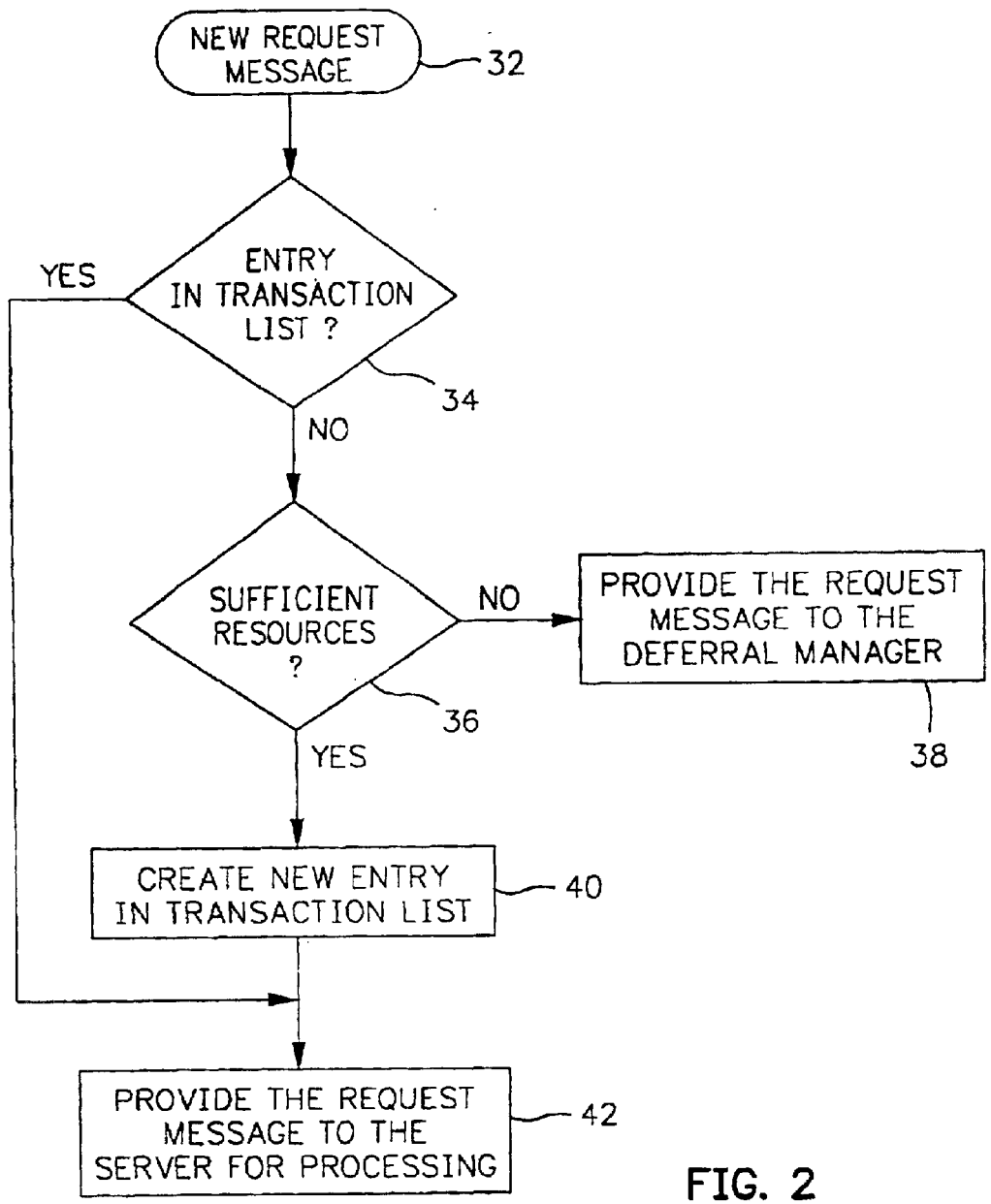
FIG. 2 is a flow diagram of the processing of arriving messages by the admission controller in one embodiment of the present invention.

Turning now to FIG. 2, a flow diagram of the processing of the arriving messages 20 by the admission controller 14 in one embodiment of the present invention is shown. The arriving messages include a new request message, and processing begins at block 32. At decision block 34, the admission controller 14 examines a client source indication in the new request message to determine whether the new request message corresponds to an entry in the transaction list 26. If the new request message corresponds to a session that is identified in the transaction list, then processing proceeds to block 42 where the new request message is passed on to the server 12 as one of the accepted messages 22.

In one embodiment, the client source indication is an IP address in the new request message that specifies its source. Correspondingly, the entries in the transaction list 26 contain the IP addresses of clients of the server 12 that are involved in sessions. The admission controller 14 compares the IP address contained in the new request message to the IP addresses stored in the transaction list 26 at decision block 34. If a match is detected then processing proceeds to block 42.

In another embodiment, the client source indication is a transaction identifier in the new request message. Correspondingly, the entries in the transaction list 26 contain transaction identifiers. At decision block 34, the admission controller 14 determines whether a transaction identifier is contained in the new request message and compares that transaction identifier, if present, to the transaction identifiers stored in the transaction list 26 and processing proceeds to block 42 if a match is detected.

Returning to decision block 34, if the new request message does not correspond to a transaction identified in the transaction list 26 then processing proceeds to decision block 36. At decision block 36, the admission controller 14 determines whether sufficient resources are available in the server 12 to adequately service a new session. The determination at decision block 36 is made based upon indications provided by the resource monitor 16 and will be discussed in further detail below. In general, utilization of the resources of the server 12 are measured at regular intervals. If the utilization rises above a specified threshold, then for the next time interval, the admission controller 14 will reject all new sessions and service only existing sessions. Once the utilization falls below the given threshold, then for the next time interval, the admission controller 14 will admit new sessions again while continuing to service existing sessions.

If there are insufficient resources to adequately sustain a new session at decision block 36, then at block 38 the admission controller 14 passes the new request message to the deferral manager 18 as one of the unaccepted messages 24. Otherwise at block 40, the admission controller creates a new entry in the transaction list 26. Thereafter, at block 42, the admission controller passes the new request message on to the server 12 as one of the accepted messages 22.

In one embodiment at block 40, the admission controller 14 creates a new entry in the transaction list 26 and writes the IP address of the new request message into the new entry of the transaction list. In another embodiment, the admission controller creates a new entry and writes a new transaction identifier into the new entry of the transaction list 26. The new transaction identifier may be returned to the requesting client that originated the request message as a "cookie" or may be returned to the requesting client in a hidden field of an HTTP form.

The entries in the transaction list 26 identifying sessions remain valid until the end of the corresponding session. A session ends and the corresponding entry in the transaction list is cleared when a new client request message corresponding to that session is not received by the admission controller 14 during a predetermined time-out interval. In addition, a session ends at a point in the session defined by the server 12. For example, if the server 12 is a web server which provides an item purchase function then the session ends and its entry is cleared from the transaction list 26 when a message is received from the client indicating the confirmation of the purchase.

There are two desirable properties for the processing of the arriving messages 20 by the admission controller 14. The first is that the admission control process be responsive, that is, that the process aims to minimize the number of aborted sessions and to achieve higher levels of service at the expense of slightly lower session throughput. A responsive process leads to a more restrictive admission controller 14. The second is that the admission control process be stable, that is, that the process aims to minimize the overreaction to utilization changes with the benefit of slightly higher session throughput. A stable process leads to a less restrictive admission controller 14. If the utilization of the resources of the server 12 during the previous time intervals is consistently high and exceeds the threshold, then a responsive admission control process is very desirable to reject newly arriving messages 20 as soon as possible. However, if the utilization of the resources of the server 12 during the previous time intervals is consistently below the threshold with occasional brief bursts of utilization, then a stable admission control process is very desirable to maximize session throughput. As one can see, these two properties are somewhat contradictory and a hybrid admission control process is a desirable achievement.

Formally, the admission control process is defined by a number of parameters including the admission control utilization threshold Uth which establishes the critical server utilization level at which the admission control process becomes more restrictive. The server utilization is measured at regular intervals where the intervals are T1, T2, . . . , Ti, . . . and their length is the admission control interval length ACil. For example, ACil might be one second so the server utilization is measured every second. The server utilization measured during the i-th interval Ti is $Umea_i$. An admission control function $f_{ac}$ is used to evaluate the observed server utilization $Uobs_{i+1}$ where $$f_{ac}(1)=U_{ac}, \qquad \text{Eq. 1}$$

$$f_{ac}(i+1)=(1-k)*f_{ac}(i)+k*Umea_i, \qquad \text{Eq. 2}$$

and k is a damping coefficient between 0 and 1 and is called the admission control weight coefficient.

The observed server utilization is used to determine the admission control process of the admission controller 14. If Uobs$_{i+1}$ is greater than Uth, then for the next time interval Ti+1, the admission controller 14 will reject all new sessions and service only existing sessions. If Uobs$_{i+1}$ is less than or equal to Uth, then for the next time interval Ti+1, the admission controller 14 will admit new sessions again while continuing to service existing sessions.

The value of the admission control weight coefficient k in Eq. 2 creates a range of admission control processes which cover the spectrum from responsive to stable. If k is equal to one, then the admission control process is based entirely on the server utilization measured during the last interval and is called responsive. If k is equal to one tenth (0.1), then the admission control process is influenced by server utilization measured over all of the prior intervals and the influence of the last interval is limited. This is called stable. As expected, a responsive admission control process leads to more restrictive admissions and achieves a better level of service but at the price of a higher percentage of new sessions refused as an result of the server being overloaded. Likewise, a stable admission control process achieves better throughput in the utilization range of eighty five to one hundred and twenty percent but at the price of a higher percentage of aborted client requests as a result of the unsatisfactory level of service. Based on these observations, a self-tunable admission control process called a hybrid was developed.

Further parameters that define the admission control process include the number of refused connections Re(i) and the number of aborted requests Ab(i) accumulated during the interval Ti. It is assumed that Ab(i) is directly related to server service levels and not to external factors on the client end such as a computer crash. External factors should be discounted from Ab(i). If the sum of Re(i) and Ab(i) is greater then zero then the process needs to be made more responsive. If the sum of Re(i) and Ab(i) is equal to zero then either the system is not overloaded or the process is perfectly balanced between responsive and stable during server overload. This balance is the ideal state for the system to operate in and results in the best quality of service.

The preferred hybrid process begins with k equal to one. Then for any time interval Ti where the sum of Re(i) and Ab(i) is greater than zero, k is made equal to one for the next time interval Ti+1. Recall that this results in the most responsive admission control process. However, this may not be the most balanced process and so at intervals the process is evaluated for possible adjustment to a less responsive process. At an evaluation interval, if the sum of Re(i) and Ab(i) was equal to zero for all of the previous time intervals since the previous evaluation interval, then k is reduced by a predetermined amount, for example 0.1. Recall that k is limited to having a value greater than or equal to zero so k cannot be reduced below zero. It is preferred that the evaluation intervals be separated by the number of time intervals that it takes to complete an average session known as an admission control cycle. The admission control cycle can be approximated by measuring an inter request time. that is the time it takes for the system to respond in addition to the time it takes for the client to evaluate the response and place a new request, multiplied by an average session length in number of requests.

An alternative to the hybrid process would be for the process not to return immediately to k equal to one upon the first sign of overload. Instead, for any time interval Ti where the sum of Re(i) and Ab(i) is greater than zero, k is increased by a predetermined amount, for example 0.1, for the next time interval Ti+1. Recall that k is limited to having a value less than or equal to one so k cannot be increased above one.

A further alternative to the hybrid process would be for the process not to consider the summation of Re(i) and Ab(i) but to consider one or the other parameter individually. This may however result in a less accurate picture of the utilization levels of the server depending on the circumstances.

The hybrid admission control process outlined above has a potential problem that one might want to address. The problem is that if the hybrid process determines that it can handle new sessions then it allows all new sessions presented to it in the next time interval. If the server is near full resource utilization, then it is possible that too many new sessions may be presented in the next time interval for the amount of resources that remain. The result is that the hybrid process allows the server to become overloaded when that is exactly what it is supposed to prevent. One way to address this problem is to allow something less than all of the new sessions presented. This may be a fixed maximum number, for example up to 10. or a fixed percentage, for example one-half. A further refinement would be to estimate the number of new sessions that the server can handle with the remaining resources and only admit that many new sessions in the next time interval. Based on this observation, an alternative to the hybrid admission control process, called predictive was developed and is presented below.

It is important for one to realize that in order to correctly estimate the number of sessions that a server is able to process per time interval, one must take into consideration the session rejection overhead. Even though a session may be rejected, this act takes up some fractional portion of the resources of the system. Under certain conditions this can add up to a significant amount and will reduce the number of sessions that can be completed. Under the most extreme conditions, the session rejection overhead may theoretically be so great so as to prevent any sessions from being completed.

In order to account for the session rejection overhead, a number of parameters that define the admission control process need to be measured or calculated. Among these is a server capacity in requests Sr which is the number of requests per time interval that a server can sustain. Next is the length, in requests rather then time, of an average completed session SesLength which is the average number of requests for a session. These values can be measured directly. Calculated from these two as the result of Sr divided by SesLength is a server capacity in sessions Ss which is the maximum number of sessions per time interval that a server can complete. The actual number of sessions applied to the server per time interval is equal to the product of Ss and Load where, for example, Load would be equal to two if the applied number of sessions was twice the server capacity in sessions. The actual number of sessions applied to the server per time interval is also equal to the sum of the number of rejected sessions per time interval x and the number of completed sessions per time interval y. These values can be measured directly. Based on these parameters, the session rejection overhead can be calculated.

One should realize that from the perspective of the admission control system there are two types of sessions. The first is the completed session which has an average length of SesLength. The second is the rejected session which is equivalent to processing one request. Thus the number of requests per time interval handled by the system is defined in the following way:

$$y*\text{SesLength}+x=Sr. \qquad \text{Eq. 3}$$

Using the relationships described above, y can be expressed in the following way:

$$y = \frac{Load * Sr}{SesLength} - x. \qquad \text{Eq. 4}$$

Replacing y in Eq. 3 with Eq. 4 and solving for x, one finds the following:

$$x = \frac{Sr * (Load - 1)}{SesLength - 1}. \qquad \text{Eq. 5}$$

Finally, the number of rejected sessions x divided by the server capacity in requests Sr is the fractional number of rejections per time interval and can be expressed as a percentage in the following way:

$$RejectionPercentage = 100 * \frac{Load - 1}{SesLength - 1}. \qquad \text{Eq. 6}$$

As reflected in Eq. 6, the rejection overhead depends on the average session length and the applied load. As a result, the shorter the average session length and the higher the applied load, the greater the rejection overhead.

Once the rejection overhead is calculated, one is able to predict the number of sessions that the server is able to handle per time interval. The relationship is derived by replacing x in Eq. 4 with Eq. 5 and rearranging, resulting in the following:

$$y = \frac{Sr * (SesLength - Load)}{SesLength * (SesLength - 1)}. \qquad \text{Eq. 7}$$

Based on the calculation of the number of sessions that the server is able to complete per time interval, a predictive admission control system will only process new sessions for the amount of resources that it has available. One will realize that this prediction is not without risk because the prediction for the next time interval is based on data from the current time interval including the applied load and a running average of the session length. Either or both of these may not prove true for the next time interval. Under certain conditions the admission control system may still allow too many new sessions in the next time interval and allow the server to become overloaded. Nevertheless, the prediction should usually be better than simply allowing all new sessions in the next time interval.

Figure 3:
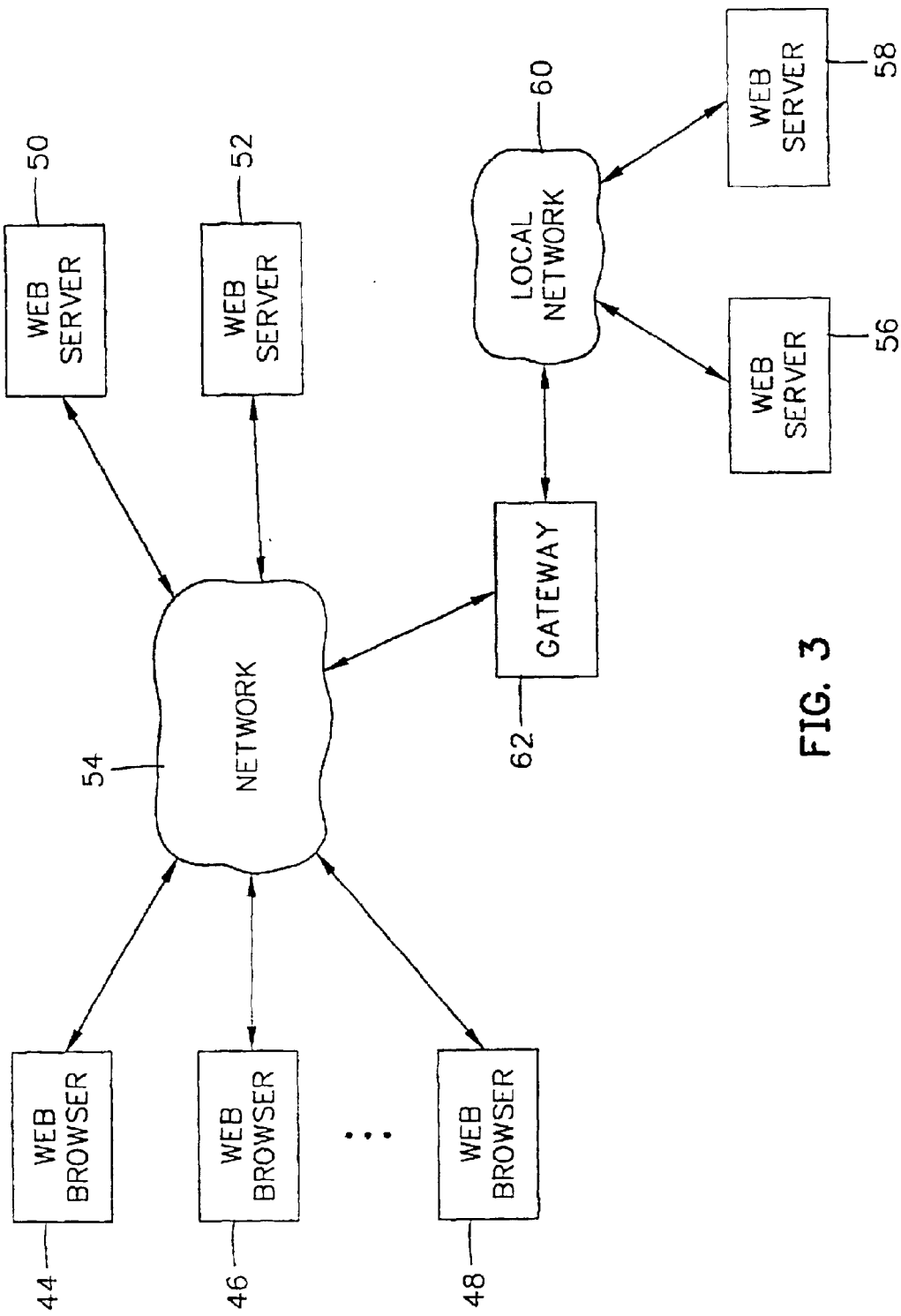
FIG. 3 is a block diagram of example configurations of web servers that employ the admission control techniques of the present invention.

Turning now to FIG. 3, a block diagram of example configurations of web servers that employ the admission control techniques of the present invention are shown. A set of web browsers 44, 46, and 48, and a pair of web servers 50 and 52 are shown coupled for communication via a network 54. In addition, a pair of web servers 56 and 58 are shown coupled for communication over a local network 60. A gateway 62 enables communication between the network 54 and the local network 60.

The web browsers 44, 46, and 48 transfer HTTP requests via the network 54 and are potential web clients to the web servers 50, 52, 56, and 58. Each HTTP request from the web browsers 44, 46, and 48 contains a Universal Resource Locator (URL), referred to as an "address," that targets one of the web servers 50, 52, 56, and 58. The network 54 routes each HTTP request to either the web server 50 or 52, or the gateway 62, depending on the particular URL contained in the request.

The web server 50 is augmented with software elements that provide functionality of the admission controller 14, the resource monitor 16, and the deferral manager 18. The deferral manager 18 in the web server 50 redirects deferred client request messages to the web server 52. The web server 52 may be a mirror site to the web server 50 or may implement special web server software for handling the deferred client requests as previously described. The resource monitor 16 in the web server 50 may employ the services of an operating system under which it executes to obtain metrics such as CPU, network, or storage subsystem utilization.

In one embodiment, the web server 50 generates transaction identifiers to identify any of the web browsers 44, 46, and 48 to which sessions are underway. The web server 50 may transfer the transaction identifiers to the web browsers 44, 46, and 48 as cookies in response messages to the web browsers. The cookies may be encoded and may have an expiration date and time. The web browsers 44, 46, and 48 include the cookies which they were allocated in subsequent request messages to the web server 50 and the admission controller 14 in subsequent request messages when determining whether to admit the subsequent request messages.

Alternatively, the web server 50 may transfer transaction identifiers to the web browsers 44, 46, and 48 as hidden fields in forms contained in response messages to the web browsers. The web browsers submit the forms including hidden transaction identifiers with subsequent request messages to the web server 50 and the admission controller 14 compares the transaction identifiers contained in submitted forms when deciding whether to admit the subsequent request messages.

The gateway 62 functions as a communication gateway between the network 54 and the local network 60 that connects to the web servers 56 and 58. The web servers 56 and 58 each may provide a different web server function. Alternatively, the web servers 56 and 58 taken together may provide a single web server function.

The gateway 62 is augmented with software elements that provide the functionality of the admission controller 14, the resource monitor 16, and the deferral manager 18. The resource monitor 16 in the gateway 62 monitors the resources of both of the web servers 56 and 58 via the local network 60. The admission controller 14 in the gateway 62 receives arriving messages targeted for the web servers 56 and 58 from the web browsers 44, 46, and 48. The admission controller 14 in the gateway 62 relays the arriving messages that correspond to sessions already underway onto the appropriate one of the web servers 56 and 58 if the resource monitor 16 indicates that sufficient resources are available in the appropriate web server 56 and 58 to adequately handle additional sessions.

The web browsers 44, 46, and 48 may be embodied as separate computer systems that execute web browser software or as one computer system executing multiple web browser applications or any combination thereof. The web browsers may be also be embodied as network computers with web browser capability or television components with web browsing capability.

Figure 4:
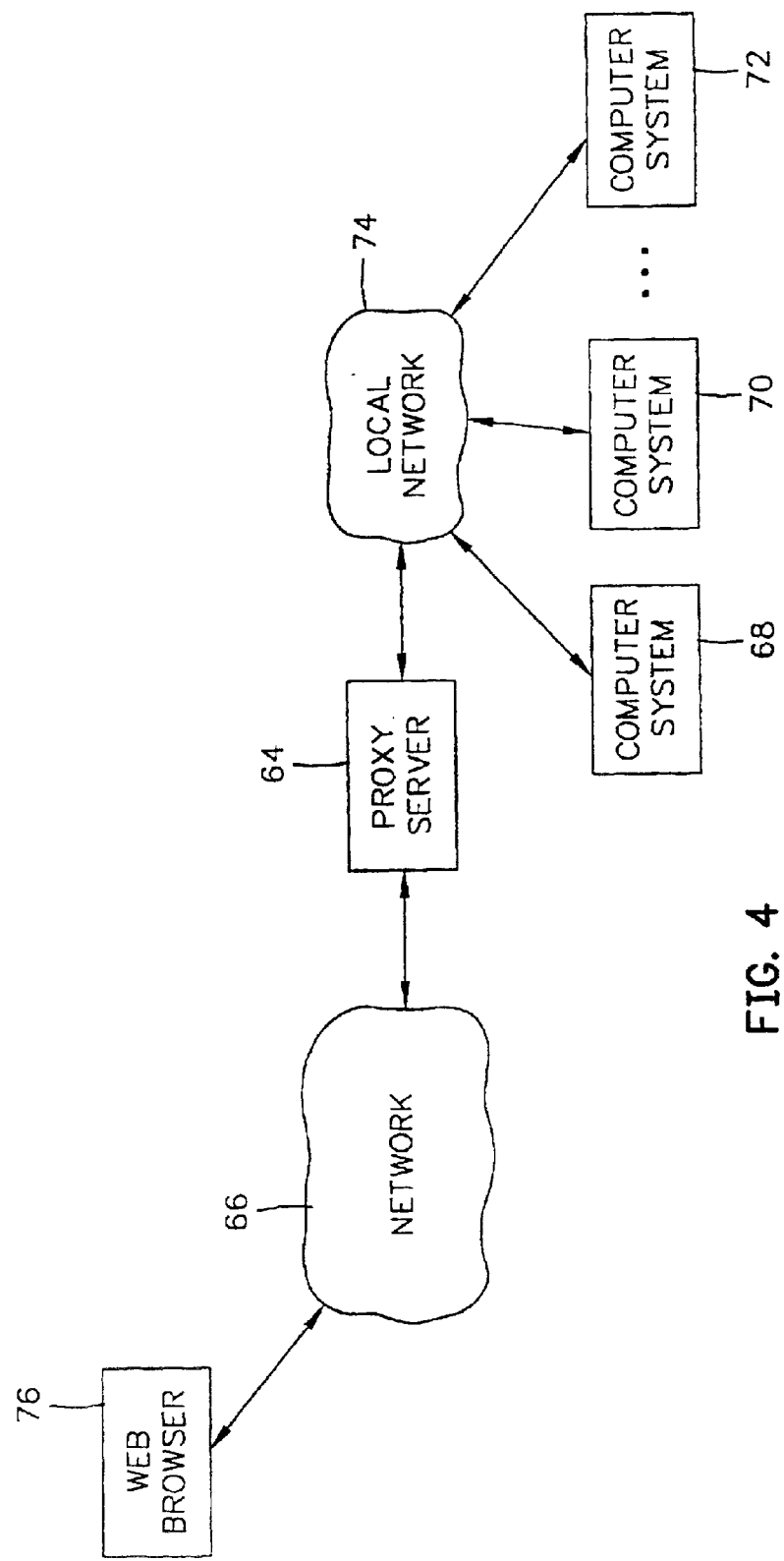
FIG. 4 is a block diagram of the application of the admission control techniques of the present invention to a proxy server.

Turning now to FIG. 4, a block diagram of the application of the admission control techniques of the present invention to a proxy server is shown. The proxy server 64 enables access to a network 66 by a set of computer systems 68, 70, and 72 coupled to a local network 74. For example, the network 66 may represent the world-wide-web of the Internet that enables access to a web server 76 and the computer systems 68, 70, and 72 may belong to a large organization and be connected via an internal organization network or local area network.

The proxy server 64 receives a stream of client request messages from the computer systems 68, 70, and 72 which are targeted for destinations on the network 66 such as the web server 76.

The proxy server 64 maintains a transaction list 26 that identifies which of the computer systems 68, 70, and 72 have sessions underway with a destination on the network 66. In one embodiment, the transaction list 26 in the proxy server 64 records network addresses on the local network 74 for the computer systems 68, 70, and 72.

The proxy server 64 also contains a resource monitor 16 for monitoring the CPU and storage subsystem utilization in the proxy server, the network utilization in the proxy server, and the network utilization on both the network 66 side and the local network 74 side. The proxy server also contains an admission controller 14 that passes request messages from the computer systems 68, 70, and 72 onto the network 66 if the client request messages correspond to sessions identified in the transaction list 26 of the proxy server. In addition, the admission controller 14 in the proxy server passes client request messages from computer systems 68, 70, and 72 not identified in the transaction list 26 if the resource monitor 16 in the proxy server indicate that sufficient resources are available to allow another session to be established.

While the invention has been illustrated and described by means of specific embodiments, it is to be understood that numerous changes and modifications may be made therein without departing from the spirit and scope of the invention as defined in the appended claims.

What is claimed is:

1. An admission control system for a server, comprising:
    a resource monitor configured to determine a server utilization metric for at least one resource of a set of resources for said server and said resource monitor is also configured to measure a number of refused connections and a number of aborted requests; and
    an admission controller configured to admit a session to said server based on a function of an admission control factor and the server utilization metric determined by said resource monitor, wherein said admission control factor is increased by a predetermined amount in response to a total of said number of refused connections and said number of aborted requests being greater than zero.

2. The admission control system according to claim 1, wherein said admission control factor is configured to cover a range from responsive to stable.

3. The admission control system according to claim 1, wherein a default value of said admission control factor is set to a highest value.

4. The admission control system according to claim 1, wherein said admission control factor, when at a lowest value, is unchanged in response to a total of said number of refused connections and said number of aborted requests being equal to zero.

5. The admission control system according to claim 1, wherein said admission control factor is reduced by a predetermined amount in response to a total of said number of refused connections and said number of abort requests being equal to zero.

6. The admission control system according to claim 1, wherein said admission control factor is a variable having a lowest value and a highest value.

7. The admission control system according to claim 1, wherein said resource monitor measures said server utilization metric over a time interval.

8. The admission control system according to claim 7, wherein said function is utilized to determine an observed server utilization based on said admission control factor and said server utilization metric.

9. The admission control system according to claim 8, wherein said admission control system rejects new sessions in response to said observed server utilization being greater than a server utilization threshold.

10. The admission control system according to claim 8, wherein said admission control system accepts new sessions in response to said observer server utilization being less than or equal to a server utilization threshold.

11. A method of admission control for a session in a server, said method comprising:
    determining an admission control factor for a time interval based on a total number of refused connections and aborted requests measured during a previous time interval;
    determining a server utilization for said time interval;
    determining an observed server utilization based on said admission control factor and said server utilization; and
    admitting said session for a next time interval in response to said observed server utilization being less than a server utilization threshold.

12. The method according to claim 11, further comprising:
    denying said session for a next time interval in response to said observed server utilization being greater than or equal to said server utilization threshold.

13. The method of claim 11, wherein determining an admission control factor for a time interval based on a total number of refused connections and aborted requests measured during a previous time interval further comprises:
    determining whether the admission control factor is set to a lowest value in the previous time interval;
    determining whether the total number of refused connections and aborted requests is equal to zero in the previous time interval; and
    maintaining the admission control factor from the previous time interval for the time interval in response to the admission control factor being set to the lowest value in the previous time interval and the total number of refused connections and aborted requests being equal to zero.

14. The method of claim 11, wherein determining an admission control factor for a time interval based on a total number of refused connections and aborted requests measured during a previous time interval further comprises:
    determining whether the total number of refused connections and aborted requests is equal to zero in the previous time interval; and
    reducing the admission control factor for the time interval by a predetermined amount in response to the total number of refused connections and aborted requests being equal to zero in the previous time interval.

15. The method of claim 11, wherein determining an admission control factor for a time interval based on a total number of refused connections and aborted requests measured during a previous time interval further comprises:
    determining whether the total number of refused connections and aborted requests is greater than zero in the previous time interval; and
    increasing the admission control factor for the time interval by a predetermined amount in response to the total number of refused connections and aborted requests being greater than zero in the previous time interval.

16. A method for controlling admission of a session to a computing system, the method comprising:

measuring a server utilization for a plurality of time intervals T(1) . . . T(n);

calculating an admission control factor for the time interval T(n) based on at least one metric measured during the time interval T(n−1);

calculating a predicted server utilization based on one or more of the measured server utilizations measured for the time intervals T(1) . . . T(n), wherein the calculated admission control factor is used to determine which of the measured server utilizations are used to calculate the predicted server utilization; and comparing the predicted server utilization to a threshold to determine whether to admit a new session.

17. The method of claim 16, wherein calculating a predicted server utilization based on one or more of the measured server utilizations measured for the time intervals T(1) . . . T(n) further comprises calculating the predicted server utilization based at least on a most recent measured server utilization, the most recent measured utilization being associated with the time interval T(n).

18. The method of claim 17, wherein calculating a predicted server utilization based on one or more of the measured server utilizations measured for the time intervals T(1) . . . T(n) further comprises calculating the predicted server utilization based on the most recent measured server utilization and at least one other measured server utilization being associated with the time intervals T(1) . . . T(n−1) if the calculated admission control factor is less than a previously calculated admission control factor.

19. The method of claim 16, wherein calculating an admission control factor for the time interval T(n) based on at least one metric measured during the time interval T(n−1) further comprises calculating the admission control factor for the time interval T(n) based on at least one of a measured number of refused connections and a measured number of aborted requests measured during the time interval T(n−1).

20. An apparatus comprising:

means for determining an admission control factor for a time interval based on a total number of refused connections and aborted requests measured during a previous time interval;

means for determining a server utilization for said time interval;

means for determining an observed server utilization based on said admission control factor, and said server utilization; and means for admitting said session for a next time interval in response to said observed server utilization being less than a server utilization threshold.

* * * * *